UNITED STATES PATENT OFFICE.

WILHELM PICKHARDT, OF NEW YORK, AND HERMANN ENDEMANN, OF BROOKLYN, N. Y., ASSIGNORS TO SAID PICKHARDT AND ADOLF KUTTROFF, OF NEW YORK, N. Y.

ACID TANNATE OF CHINOLINE.

SPECIFICATION forming part of Letters Patent No. 260,317, dated June 27, 1882.

Application filed May 3, 1882. (Specimens.)

*To all whom it may concern:*

Be it known that we, WILHELM PICKHARDT, a citizen of the United States, residing at New York, in the county and State of New York, and HERMANN ENDEMANN, a citizen of the United States, residing at Brooklyn, in the county of Kings and State of New York, have invented new and useful Improvements in Chinoline Compounds, of which the following is a specification.

This invention relates to a compound which is obtained by the action of tannic acid on chinoline.

In carrying out our invention we take by preference the chinoline of Skraup, or we prepare such chinoline according to the patent, No. 241,738, granted to Zdenko H. Skraup, May 17, 1881, and then we free the same from the impurities mixed therewith by treating it with tartaric acid, whereby a tartrate of chinoline is obtained, and then we liberate from this salt the chinoline by treating its aqueous solution with caustic alkalies.

In preparing our new compound we take 62.4 pounds of tannic acid and thirteen pounds of chinoline, or, in other words, about five pounds of tannic acid to one pound of chinoline, and add thereto a very small quantity of water, the mixture being heated on a water bath and stirred until the water has evaporated. No more water should be taken than is necessary to thoroughly mix the substances. The result of this operation is an acid tannate of chinoline which, when cold and dry, is an amorphous resinous mass. Boiling water poured over it converts it into an oily liquid, which loses by continued contact with water one-third of its acid, leaving the neutral tannate chinoline behind. The acid tannate is soluble in alcohol. If its aqueous solution is evaporated, it loses chinoline, even in the presence of a large excess of acid.

The principal advantage of our new compound, particularly for medical purposes, is that by the addition of tannic acid to chinoline the peculiar odor of the chinoline is almost entirely destroyed.

What we claim as new, and desire to secure by Letters Patent, is—

As a new article of manufacture, the acid tannate of chinoline having the properties above stated.

In testimony whereof we have hereunto set our hand and seals in the presence of two subscribing witnesses.

WM. PICKHARDT. [L. S.]
H. ENDEMANN. [L. S.]

Witnesses:
W. HAUFF,
E. F. KASTENHUBER.